(12) United States Patent
Kuepper

(10) Patent No.: US 7,429,232 B2
(45) Date of Patent: Sep. 30, 2008

(54) DRIVE TRAIN AND METHOD FOR CONTROLLING A DRIVE TRAIN

(75) Inventor: Klaus Kuepper, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 11/788,167

(22) Filed: Apr. 19, 2007

(65) Prior Publication Data

US 2007/0197344 A1 Aug. 23, 2007

Related U.S. Application Data

(60) Division of application No. 11/188,078, filed on Jul. 22, 2005, now Pat. No. 7,229,384, which is a continuation of application No. PCT/DE2004/000108, filed on Jan. 24, 2004.

(30) Foreign Application Priority Data

Jan. 27, 2003 (DE) .............................. 103 02 995

(51) Int. Cl.
*F16H 59/64* (2006.01)
*B60W 10/02* (2006.01)
(52) U.S. Cl. .......................... 477/97; 477/175; 477/176
(58) Field of Classification Search ......... 477/174–176, 477/97
See application file for complete search history.

(56) References Cited

U.S. PATENT DOCUMENTS

| 4,158,248 | A | * | 6/1979 | Palmer ........................ 15/321 |
| 6,502,027 | B2 | * | 12/2002 | Saotome et al. ............... 701/67 |
| 6,676,562 | B1 | * | 1/2004 | Bulgrien ...................... 477/74 |

FOREIGN PATENT DOCUMENTS

| DE | 10012122 | 9/2000 |
| DE | 10065589 | 7/2002 |
| GB | 2232453 | * 12/1990 |

* cited by examiner

*Primary Examiner*—Ha D. Ho
(74) *Attorney, Agent, or Firm*—Simpson & Simpson, PLLC

(57) ABSTRACT

A method for controlling a drive train of a motor vehicle, to a method for controlling a clutch device, and to a drive train of a motor vehicle, the drive train being operated in a normal load operation, in which the internal combustion engine moves the motor vehicle against the resistances opposing the movement of a motor vehicle, the play in the load direction pre-determined by the rotary direction of the motor output shaft being closed. The drive train (40) operating outside normal load operation is operated under pre-determined conditions in a second operating mode in which a first load is introduced into a drive train section, causing the play at the drive-end of the load introduction point to be closed or to remain closed, the first load being such that it would not be sufficient to overcome the resistances opposing the movement of the motor vehicle in the plane.

18 Claims, 4 Drawing Sheets

DRIVE TRAIN AND METHOD FOR CONTROLLING A DRIVE TRAIN

CROSS REFERENCE TO RELATED APPLICATIONS

This application is a divisional application claiming priority of U.S. patent application Ser. No. 11/188,078, filed Jul. 22, 2005 which issued as U.S. Pat. No. 7,229,384 on Jan. 12, 2007, filed under 35 U.S.C. §120 and §365(c) as a continuation of International Patent Application PCT/DE2004/000108, filed Jan. 24, 2004, which claims priority of German Patent Application 103 02 995.8 filed Jan. 27, 2003, which applications are incorporated herein by reference.

FIELD OF THE INVENTION

The invention relates to a method for controlling a drive train of a motor vehicle, a method for controlling a clutch device as well as a drive train for a motor vehicle.

BACKGROUND OF THE INVENTION

Drive trains for motor vehicles and methods for controlling them are already known. Furthermore, methods for controlling a clutch device are known.

OBJECT OF THE INVENTION

The object of the present invention is to create a method for controlling a drive train of a motor vehicle, a method for controlling a clutch device and a drive train for a motor vehicle that enables high operational reliability and/or good driving comfort if this drive train or this clutch device is used in a motor vehicle.

BRIEF SUMMARY OF THE INVENTION

According to the invention, a method for controlling a drive train of a motor vehicle in particular is provided. This drive train that is to be controlled has an internal combustion engine or may be coupled to an internal combustion engine. The internal combustion engine is provided with an engine output shaft and is able to load the drive train during operation under prescribed conditions. The drive train also has a transmission device. In the transmission device different gear ratios may be shifted in a continuously variable or stepped manner. The transmission device may, for example, be an automated-shift transmission (ASG). The transmission device may also be a manual shift transmission or another type of transmission device. For example, the transmission device may also be a so-called parallel-shift transmission (PSG).

Furthermore, a clutch device is provided in the drive train. This may be a starting clutch. The clutch device is configured in particular as a friction clutch. The clutch device is in particular an electronically controlled clutch device. In a preferred design, the clutch device is configured as a dry clutch.

A transmission input shaft in particular is provided in the area of the transmission device facing the internal combustion machine and is provided within the drive train between the clutch device and the transmission device. This may be such that the transmission input shaft extends from the clutch device to the transmission device.

In the drive train, multiple components are coupled with play. These may, for example, be components that are disposed within the drive train on the side of the clutch device that faces away from the internal combustion engine. Play of this type may be present at different places and augment an overall play.

Drive train components coupled with play may (in part) be identical to those parts of the drive train that were already mentioned or are mentioned or may be other parts. For example, play may be provided between meshing gear wheels of the transmission device. The play may also be present, for example, in the differential, if such a one is present, or at a drive shaft or the like. Play may also be present in the drive train at other places.

According to the invention, it is provided in particular that the drive train be operated under prescribed conditions in a first operating mode, the normal load operation. This normal load operation may be such that the internal combustion engine moves the vehicle against the resistances directed against a movement of the vehicle, the play in the load direction prescribed by the rotary direction of the engine output shaft being closed. The resistances directed against the vehicle are in particular road resistances, such as air resistance, starting or rolling friction or the like.

What is meant by the play of the load direction prescribed by the rotary direction of the engine output shaft being closed is in particular that when there is a load in this direction the parts engaging with each other with play fit tightly in this direction in such a manner that there is essentially no play in this direction, while in the opposite rotary direction of the engine output shaft the play opens up or is present between these two parts.

According to the invention, it is provided in particular that the drive train outside of the normal load operation is operated under pre-determined conditions or in the presence of pre-determined conditions in a second operating mode or is switched into it. This does not necessarily mean that this second operating mode is always present if the normal load mode is not present. In the second operating mode, it is provided in particular that a first load is introduced in the drive train section disposed on the side of the clutch device facing away from the internal combustion engine. This load is directed or acts in such a manner that the play is closed or remains closed on the output side of this load introduction point. The output side in this context means the side that is disposed facing away from the engine. The first load in this context is such that it would not be or essentially not be sufficient to overcome the resistances opposing the movement of the motor vehicle on level road. This does not mean that the motor vehicle in the second operating mode must be on level road.

For example, it may be provided that the motor vehicle is on a slope with the service brake activated, and the downgrade force is such that the braking force is overcome and the motor vehicle begins to move when the clutch is disengaged. For example, the drive device may introduce a first load on the drive train section—or a partial section thereof—that is disposed on the side of the clutch device facing away from the internal combustion engine so that the play on the output side of the load introduction point is closed or remains closed. Closed play also in this case means that, when there is an intended loading by the engine output shaft, the play is not disposed on the side of load direction prescribed by the engine output shaft, rather, the opposite side.

In such a movement on a slope, it is therefore preferably provided that the load introduced by the drive device in a vehicle of the pre-determined type provided with a drive train would not be sufficient to overcome the resistances opposing the movement of the vehicle on level road.

It should be noted that the first and second and/or third operating mode do not have to be all of the operating modes; rather, there may be additional operating modes.

In a preferred embodiment, it is provided that a drive device other than an internal combustion engine is provided, which may be provided in the area of the load introduction point. This drive device may, for example, be a starter generator. The drive device may be provided, for example, on the transmission device or in the area of the transmission device. Other places may also be provided at which such a drive device is located. The drive device loads the drive train under pre-determined conditions, and this may in particular be such that the play in the drive train is closed or remains closed on the output side of this load introduction point.

It may also be provided that instead of a drive device other than the internal combustion engine, the energy of the internal combustion engine is used and in part is accordingly conducted in such a manner that an appropriate load may be introduced at one of the aforementioned load introduction points.

According to the invention, a method is provided in particular for controlling a clutch device that is disposed within a drive train of a motor vehicle. Such a clutch device may in particular be a starting clutch. Examples for such a clutch device or preferred embodiments of such a clutch device were already mentioned above.

The clutch device may be shifted into a status in which it cannot transmit any torque. Furthermore, the clutch device may be shifted into a status in which it can transmit a torque. The clutch device is preferably automatically controlled.

The status in which the clutch device is able to transmit a torque may in particular be subdivided into different substatuses. It may be provided, for example, that the clutch device may be completely engaged. Furthermore, it may also be provided that the clutch device may be engaged in such a manner that it is able to transmit a pre-determined torque and slips when a greater load is introduced.

Preferably, a braking device is provided with which it is possible to brake the motor vehicle or the drive train. Such a braking device may, for example, be a service brake.

According to the invention, it is provided in particular that the drive train be shifted into a third operating mode or operated in a third operating mode under pre-determined conditions or in the presence of pre-determined conditions. This third operating mode is in particular such that the clutch device is engaged far enough that it is able to transmit a first clutch torque. This clutch torque is in particular such that the clutch device slips when the engine load is applied. As a condition for this first clutch torque being shifted and/or maintained, there is preferably a requirement that the internal combustion engine run and the braking device be actuated.

In a preferred design, the pre-determined first clutch torque that can be transmitted by the clutch device is such that on level road it would not suffice to set the motor vehicle in motion from a standstill against the resistances acting against a movement of the motor vehicle.

Preferably, it is provided that the first load or the first clutch torque is essentially kept low enough that this load or this clutch torque would not suffice to overcome the resistances that are directed against the movement of the motor vehicle on level road as long as the related drive train play is at least partially open.

It should be noted that—as mentioned—a first load may be introduced in the drive train or a first clutch torque may be built up in order to close the drive train play or keep it closed in a pre-determined drive train section.

For the sake of simplified illustration, the invention or the preferred designs and exemplary embodiments of the invention are explained in detail with reference to a design in which this play is closed via a first clutch torque. However, it should be mentioned that in an appropriate manner the first load might also be used in addition or as an alternative.

Preferably, the first clutch torque is built up to a value that essentially corresponds to between 0.5% and 3% of the torque that is producible by the internal combustion engine in the drive train and/or of the maximum torque transmissible by the clutch device. It may be provided that the first clutch torque is set to a value that is essentially between 0.1 N/m and 4 N/m. However, other values are also preferred.

According to a preferred design, the first load or the first clutch torque is built up in a ramp-like manner to a pre-determined value. It may also be provided that the first clutch torque or the first load, if it is decreased, is decreased in a ramp-like manner.

However, there may be other forms of the torque build-up and/or the torque decrease. The torque after its buildup may be kept at a constant value for a pre-determined time period. However, it may also be provided that it is not held at a constant value, but instead is changed continually or from time to time. In a preferred design, the first clutch torque is restricted in time to a pre-determined value. For example, it can be held for five seconds at a specific value. However, it may also be provided that another time period is provided that is greater or less than five seconds. However, it may also be provided that a maximum value is provided for a time period during which the torque is kept at a constant or non-constant value.

Preferably, the first clutch torque or the first load is then reduced to zero.

It may also be provided that during the torque build-up the torque is briefly increased at the beginning.

However, there may also be other designs of the torque build-up as well as the torque reduction and a torque curve of the first clutch torque that is present between these two in some cases.

As mentioned, the same is true for the first load.

In a preferred design, it is provided that the first clutch torque is built up within a pre-determined time period. Such a time period may, for example, be within the range of 200 to 800 ms. However, other time periods for the torque buildup are also preferred. The same is true for the torque reduction of the first clutch torque.

Preferably it is provided that the clutch device has been or is disengaged outside of the second and/or third operating mode of the drive train if the motor vehicle or the output side end of the motor vehicle is at a standstill, a gear is engaged in the transmission device, and a braking device of the motor vehicle is actuated. The engaged gear in this context may in particular be a forward gear. However, it may also be a reverse gear. The braking device is preferably a service brake of the motor vehicle.

It should be noted that the service brake may in particular be such that it acts on the output side end of the drive train, especially on wheels, which may be mounted on axles there.

In a preferred design of the method of the invention, the inclination of the motor vehicle in relation to the ground below is qualitatively and/or quantitatively determined. It should also be noted in this context that the inclination of the drive train in relation to a pre-determined plane might also be determined.

It may be provided that, for example, when an inclination of the motor vehicle or the drive train is detected under pre-determined conditions, a conclusion is made that the motor vehicle or a driven-side drive train section is set in motion under the effect of the driving force if pre-determined conditions are present. Such conditions may, for example, be such that the clutch device is disengaged and/or the vehicle or the end-side drive train section was previously at a standstill and/or a braking device of the motor vehicle or a braking device acting on the end section of the drive train is closed and a movement of the end-side drive train section or of the vehicle is detected.

It should be noted that a closed braking device means that this braking device is closed far enough that a braking force is applied. This may be a pre-determined minimum braking force or a pre-determined minimum pressure or any applied braking force at all or any applied braking pressure at all, that is, any braking force or a braking pressure that is greater than zero.

This means that the braking force or the braking pressure must not be at a maximum when the brake is applied.

In a preferred design, it is provided that a braking device, which may be designed as a service brake, for example, may act on the drive train or the motor vehicle. In this context, it is especially preferably provided that a brake light signal or a braking signal can be generated or is generated if the braking device is actuated or is at least partially actuated. Also in this case it is true that the operation of the braking device may be such that the braking device produces a pre-determined minimum braking torque or a pre-determined minimum braking force or a pre-determined minimum braking pressure or may be such that any braking force or braking pressure or braking torque is produced at all.

It may also be provided that a determination is made of whether a transmission input shaft rotates at a speed that is less than the engine speed. In this context, any ratios that may be present can be taken into account. This may also be such that any ratios between the transmission input shaft and the engine output shaft are taken into consideration in such a manner that the particular speeds of these shafts are recalculated at a pre-determined reference point. However, it may also be provided that the transmission input shaft and the engine output shaft rotate at the same speed when the clutch device is fully engaged.

In a preferred design, it is provided that the operation of a braking device is detected or is assumed if it is detected or determined that the brake light signal is present or is generated.

Preferably, the drive train is operated under pre-determined conditions in the second operating mode and/or in the third operating mode or shifted in this operating mode if it was determined that, when a gear is engaged in the transmission device as well as when the internal combustion engine is running and when the braking device is actuated, the transmission input shaft rotates at a speed that is less than the current engine speed. Especially preferably, it is provided in this context that it is also required as an operation that the speed of the transmission input shaft be greater than zero.

It should be noted in this context that possible ratios might be taken into consideration.

A requirement may also be provided that a braking signal be generated instead of the operation of the braking device or in addition to it. It may also be provided that from a given or detected brake signal a conclusion is made that the braking device is activated. It may also be additionally required that the vehicle be rolling.

In particular it may be provided that when the braking device is activated the first clutch torque is only built up while the vehicle is rolling in the drive direction of the engaged gear, and in particular if other of the aforementioned pre-determined conditions are present.

In an especially preferred design, a low clutch torque, such as 2 to 4 Nm is built up in a ramp-like manner if the presence of the aforementioned conditions is detected. This buildup may occur, for example, within a time period of 200 to 400 ms. However, it should be noted that the low clutch torque may also have another value or may be built up in another manner. Likewise, the prescribed time period may be a different time period.

Preferably, the drive train is operated in the third operating mode or is switched in the third operating mode if pre-determined conditions are present and the clutch temperature is less than a pre-determined temperature threshold. Such pre-determined conditions may in particular be those mentioned above, that is, that the braking device is actuated, a gear is engaged in the transmission device, the internal combustion engine is running and the speed of the vehicle allows the transmission input shaft to rotate, but at a speed that is less than the current engine speed.

However, other conditions may also come up in addition to the one that the clutch temperature is less than a pre-determined temperature threshold.

Preferably, it is provided that the clutch torque cannot be built up above a pre-determined limit clutch temperature and/ or cannot be operated in the second or third operating mode.

It is also preferable that the drive train is only operated in the second and/or in the third operating mode if it has been detected repeatedly that pre-determined conditions are present that are supposed to be present for operation in the second and/or third operating mode and/or for shifting into the second or third operating mode. This may in particular be such that the presence of the prescribed conditions is required two times or three times or four times or five times or even more than five times before there is a shift into the second and/or third operating mode or the drive train is operated in this operating mode. It is especially preferably provided that the buildup of the first clutch torque only be permitted after the corresponding conditions or the corresponding situations have been detected repeatedly and no "clutch synchronization" was achieved in the interim.

Preferably the drive train is operated for a pre-determined time period in the second and/or third operating mode if there has been a shift into this operating mode. It may also be provided that a maximum time period or a minimum one is determined while the drive train is operated in this second or third operating mode after it has been shifted into them.

Such a time period may, for example, be five seconds. However, it may also have a different duration. It is especially preferably provided that after this time period the torque transmitted by the clutch is reduced back to zero.

In a preferred design, the rolling direction of the vehicle or a corresponding rotary direction of the drive train section on the output side is determined. It may be provided that the drive train is only operated in the second and/or third operating mode or is shifted into this operating mode if it has been determined that pre-determined conditions are present and the rolling direction of the motor vehicle or the rotary direction of the drive train corresponds to the driving or rotary direction that is assigned to or corresponds to the gear currently engaged in the transmission device. Also, these pre-determined conditions might be such as were already mentioned or such as will be mentioned below or may be others.

Regarding the gears engaged in the transmission device, a distinction is made in particular between forward gears and the reverse gear(s).

It may be provided that the gradient of the braking pressure of the braking device and/or the braking pressure itself is determined. In a corresponding manner, the braking force or the braking torque or the particular gradient of each may also be determined.

In a preferred design, it is provided that the drive train is shifted into the second and/or third operating mode if it is detected that pre-determined conditions are present and the gradient of the braking pressure or the braking force or the braking torque exceeds a pre-determined position and/or the braking pressure or the braking force or the braking torque falls below a pre-determined threshold.

Also in this case the pre-determined conditions may be such as were already mentioned or such as will be mentioned below.

In a preferred design, it is provided that the first clutch torque that is transmissible by the clutch device is built up if it is detected that pre-determined conditions are present and the gradient of the braking pressure or the braking torque or the braking force exceeds a pre-determined threshold. It may also be provided that this first clutch torque is built up if the braking pressure or braking force or braking torque falls below a pre-determined threshold.

It is especially preferable that, when the aforementioned threshold is exceeded or fallen below, the first clutch torque is built up and this first clutch torque is reduced if it is detected later that the vehicle is not rolling or the drive train is not accordingly in motion.

In an especially preferred design, it is provided that a motor vehicle or the end region of the drive train on the output side is at first stationary and a gear is engaged in the transmission device. This may, for example, be a forward gear. Furthermore, it is provided in this preferred design that the brake is actuated and the clutch—in particular because of this—is disengaged. In this preferred design, it may also be provided that in the event that the vehicle is on a downward sloping street and the brakes as a result are slowly released or the vehicle begins to roll slowly, the brake light switch still being activated, the drive train being driven from behind, that is, driven by the output side, this overall situation being detected or determined. In this preferred design, it is provided in particular that a slight initial clutch torque that is transmissible by the clutch is slowly built up in order to reduce the play in the drive train slowly and/or with low torque.

However, it may also be provided in this preferred design that in a regular operation the clutch is engaged if the driver expresses a desire—by operating the accelerator pedal, for example—to start out and/or if—especially triggered by the brake light switch being disconnected—a creeping function is activated. In this context it is provided that during "creeping" the clutch is engaged further or a greater torque may be transmitted than corresponds to the first clutch torque or than is present in the third operating mode. Furthermore, it is provided that the clutch torque that is built up if the driver expresses a starting off desire is greater than the clutch torque that is built up during the "creeping" operation.

It is therefore provided in particular that a drive train is coupled or may be coupled to an internal combustion engine and has a starting clutch device configured as a friction clutch. In this design, the drive train furthermore has a transmission device. The friction clutch and the transmission device may be designed, for example, as was mentioned above.

In this design, an electronic controller is also provided. This electronic controller may have a memory storage device or be coupled to a memory storage device. A controller program, which in particular may be a computer or software program, is stored in this memory storage device.

According to the invention, it is provided that this controller program stored in the memory storage device in conjunction with the aforementioned components or a portion of these components can control a method according to the invention or controls it in corresponding situations that are described above as examples.

It may also be provided that a drive device, such as a starter generator, is provided. This drive device may be different from the internal combustion engine of the motor vehicle. It may also be designed in such a manner that energy of the internal combustion engine is conducted accordingly, and this energy can load a section of the drive train, which may in particular also be disposed on the output side via the clutch.

This loading may occur in particular in the area of a load introduction point. The load introduction point may be provided, for example, in the transmission device or in the area of the transmission device. In this design, it may be provided in particular that the loading of the drive train in the area of this load introduction point is such that the play in the drive train is closed or remains closed on the output side of this load introduction point.

Such a drive device may be connected to the electronic controller via a communication link. In this context, it may be provided that the electronic controller controls the drive device—at least among others.

It may also be provided that the electronic controller controls the clutch actuation or clutch device and in particular such that the clutch device is operated or may be operated according to a method of the invention.

It should be noted that a drive train might be configured in such a manner that any drive train play is closed under pre-determined conditions via a drive device such as a starter generator. It may also be provided that this play is closed via a clutch device.

Combinations of these designs are also preferred.

In a preferred design, the electronic controller has a communications link to at least one electric motor. In this context, this electric motor may be an electric motor via which the clutch device may be operated. There may be present in the transmission section between the electric motor and the clutch device, for example, mechanical or hydraulic components. The force transmission may be based on a corresponding principle. Other principles are also preferred.

The term "control", in the sense of the present invention means in particular "regulating" and/or "controlling" in the sense of the DIN (German Standards Institute). The same is true for terms derived from the term "control".

The patent claims submitted with the application are proposed formulations without prejudice to the achievement of further patent protection. The applicant reserves the right to submit claims for further combinations of features previously only disclosed in the description and/or the drawings.

References used in dependent claims refer to the further development of the subject matter of the principle claim via the features of the particular dependent claim; they are not to be understood as a renunciation of achieving independent protection for the combination of features for the dependent claims that are referenced.

Since the subject matter of the dependent claims may constitute separate and independent inventions in relation to the state of the art on the priority date, the applicant reserves the right to make them the subject matter of independent claims or division declarations. Furthermore, they may also contain independent inventions that have a design that is independent of the subject matter of the preceding dependent claims.

The embodiments are not to be understood as a restriction of the invention. Rather, numerous amendments and modifications are possible within the context of the current disclosure, especially those variants, elements and combinations and/or materials that one skilled in the art may learn, for example, by combining individual ones together with those in the general description and embodiments in addition to features and/or elements or methodological steps described in the claims and contained in the drawings with the aim of achieving the objective and leading to a new subject matter or new methodological steps or sequences of steps via combinable features, even as far as production, testing and work procedures are concerned.

BRIEF DESCRIPTION OF THE DRAWINGS

Some exemplary or preferred aspects of the designs according to the invention are explained below with reference to the Figures, but they are not to be regarded as limitations of invention.

In the drawing.

DETAILED DESCRIPTION OF THE PREFERRED EMBODIMENT

Figure 1:
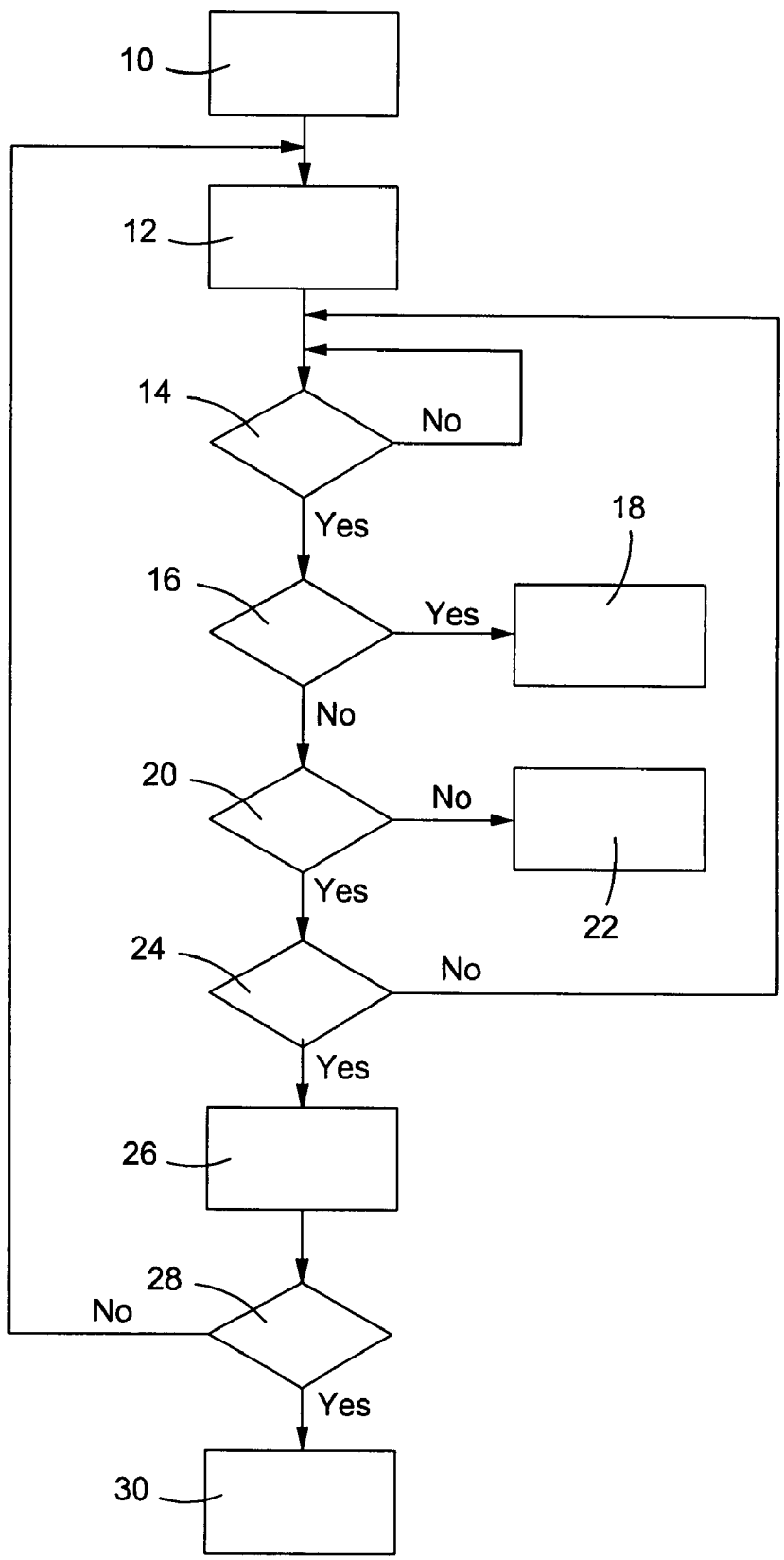
FIG. 1 shows an exemplary method according to the invention in diagrammatic illustration.

FIG. 1 shows the steps of an exemplary method according to the invention in diagrammatic illustration;

In step 10, a counter is set to zero.

In step 12 a motor vehicle is found with the drive train stationary. Furthermore, a gear is engaged in step 12 in a transmission device of the drive train. This may, for example, be a forward gear. Moreover, in step 12 a braking device of the vehicle, such as a service brake, is actuated. Furthermore, in step 12 a starting clutch is disposed in the drive train so that this clutch essentially cannot transmit any torque. This clutch may in particular be an automatic clutch device. It may also be provided that in step 12 a check is made of whether these conditions are present.

In step 14, a check is made of whether the motor vehicle is still stationary as before or whether the motor vehicle is set in motion. It may also be provided that, in addition, a check is made of whether a gear is still engaged as before in the transmission device and the brake is activated and the clutch is disengaged. Instead of checking whether a brake is activated, a check may also be made of whether a brake light switch is activated.

If in step 14 it is detected that the vehicle is still stationary as before, the sequence is continued in step 14. If a check is also made in step 14 of whether a gear is engaged in the transmission device and the braking device is actuated and the clutch device is disengaged, the sequence is continued in step 14 if one of these conditions is not present.

In step 16 a check is made of whether the accelerator pedal is being operated provided that the drive train is disposed in a motor vehicle. If this is not so, step 16 may also be omitted.

If a determination is made in step 16 that the accelerator pedal is being operated, the sequence is continued in step 18. In step 18, the clutch device is engaged for driving the motor vehicle or in order to move the motor vehicle in a normal driving mode. In this context, the clutch device is engaged according to a pre-determined characteristic, which may, for example, be electronically controlled.

However, if in step 16 it is determined that the accelerator pedal is not being operated, a check is made in step 20 of whether the braking device is still engaged as before. It is also possible to omit this step. If a determination is made in step 20 that the braking device is no longer closed, the sequence is continued in step 22. In step 22, the clutch device is engaged and in particular such that it is able to transmit a limited pre-determined torque. This pre-determined torque is such that the vehicle begins to creep.

However, if a determination is made in step 20 that the braking device is still closed as before, the sequence is continued in step 24.

In step 24 a check is made of whether, as before, a gear is still engaged in the transmission device, whether the internal combustion engine, which loads or can load the drive train, is running and, if so, whether the braking device is still actuated as before. Furthermore, a check is made in step 24 of whether a speed of the motor vehicle or of the end of the drive train on the output side is detected that allows the transmission input shaft to rotate and in particular such that the speed of the transmission input shaft is less that the current engine speed. In this context, ratios may be taken into account if necessary.

If it is determined in step 24 that no gear is engaged in the transmission device or the internal combustion engine is not running or a speed of the vehicle that allows the transmission input shaft to rotate at a speed that is less than the current engine speed is not present, or—if this has been checked—the brake is not actuated, the sequence is continued in step 14.

However, if it is determined in step 24 that a gear is engaged in the transmission device, the internal combustion engine is running and a speed of the vehicle that allows the transmission input shaft to rotate is present, and in particular at a speed that is less than the current engine speed, and—if this has been checked—the brake is actuated, the sequence is continued in step 26.

In step 28 a check is made of whether the counter, which was increased by "1" in step 26, is greater than a pre-determined value. In some cases, an additional check is made of whether the timer has exceeded a pre-determined value.

As a result, in a preferred design a check may be made of whether the conditions that were checked in step 24 were repeatedly present or were repeatedly within a pre-determined time period. In another preferred embodiment, such counters may also be omitted.

However, if counters of this type are used and it is detected in step 28 that the counter that was increased by "1" in step 26, has not reached the limit checked in step 28 and/or the time period has not exceeded a prescribed time threshold, the sequence is continued in step 12. It should be noted that such a counter might also be integrated at a different point or at several different points.

However, if in step 28—when an appropriate counter is present—it is detected that the corresponding limits are reached, the clutch device is engaged slightly in step 30 so that it is able to transmit a limited torque. This torque is preferably such that it would not be sufficient to set a motor vehicle in motion against the road resistances when this motor vehicle is on level road. In particular this first torque that is transmissible by the clutch device and is set or built up in step 30 is less than the torque that is built up in step 22.

Figure 2:
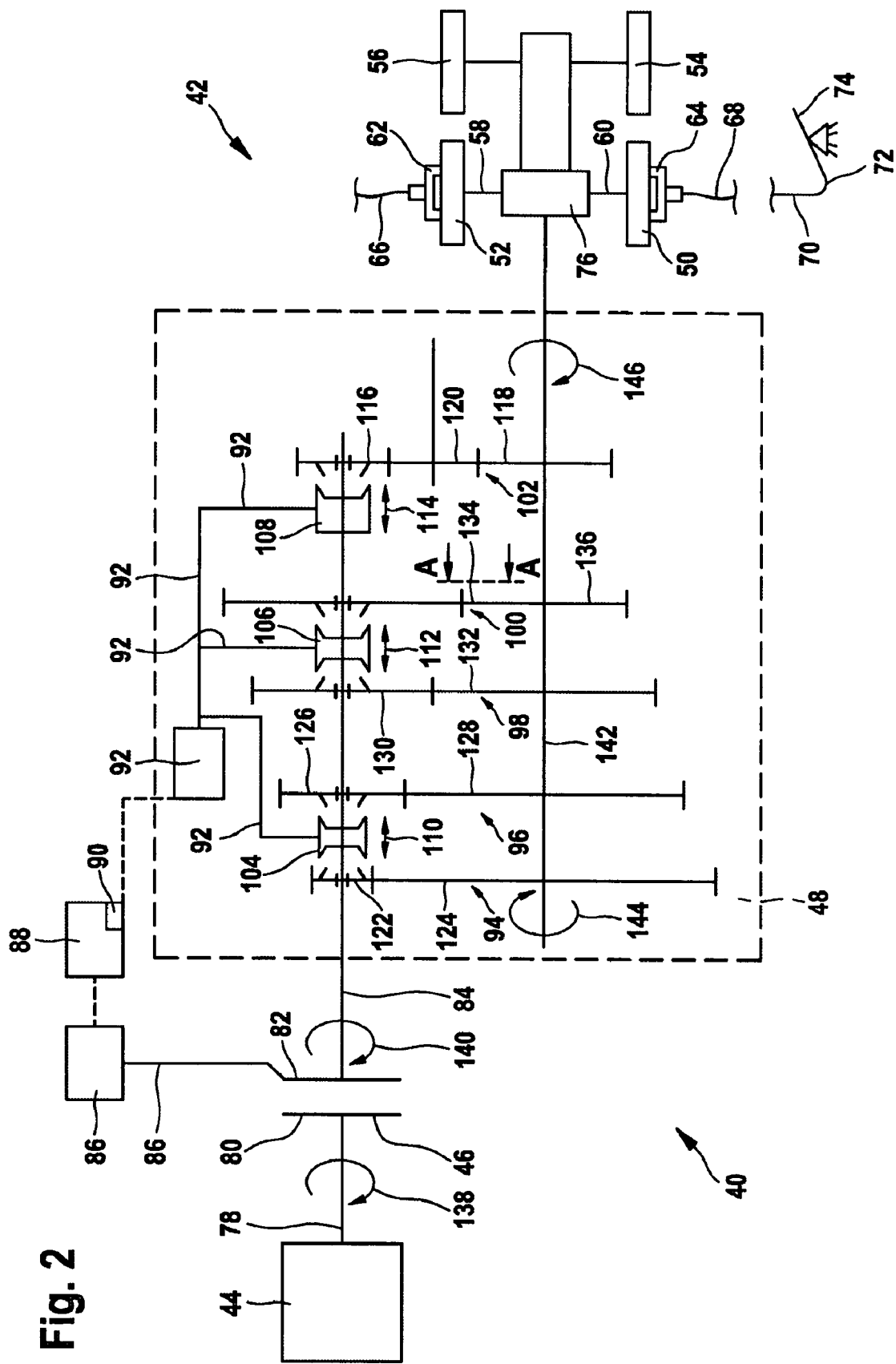
FIG. 2 shows an exemplary embodiment of the invention in diagrammatic illustration.

FIG. 2 shows an example of drive train according to the invention 40 that is disposed in a motor vehicle 42 in a starkly diagrammatic illustration.

In the design according to FIG. 2, an internal combustion engine 44 is provided that is able to load drive train 40. Furthermore, drive train 40 has a clutch device 46, which may be an automatic clutch device, for example, and in particular is a friction clutch. Clutch device 46 is in particular a starting clutch of motor vehicle 42.

In drive train 40, a transmission device 48 is also provided Furthermore, wheels 50, 52, 54, 56 are provided, of which at least a portion 50, 52 is coupled to drive axles 58, 60. In particular the front axles or the rear axles or both the front and rear axles may be driven.

Furthermore, a braking device 62, 64, 66, 68, and 70 is provided with an actuating mechanism 66, 68, 70, and 72. This actuating mechanism 66, 68, 70, 72 may, for example, have a brake pedal 74.

Furthermore, a differential 76 is provided where appropriate.

Internal combustion engine 44 is provided with an engine output shaft 78 that extends in the direction of the clutch input part 80 of clutch device 46.

Transmission device 48 is provided on the output side of, i.e., facing away from, internal combustion engine 44, clutch device 46 or clutch output section 82. A transmission input shaft 84, which belongs to the transmission or extends into the transmission, is disposed between clutch device 46 and transmission device 48.

Clutch device 46 may be operated by a clutch actuation mechanism that is diagrammatically explained via reference character 86. According to FIG. 2, this operation is such that clutch 46 may be disengaged in such a manner that it cannot transmit any torque and therefore may be engaged in such a manner that it can transmit a limited torque and be further engaged. If clutch 46 is able to transmit its maximum clutch torque, it is preferably provided that this maximum torque transmissible by the clutch is greater than the torque that may be produced by internal combustion engine 44.

The actuation mechanism 86 may be configured in a different way. For example, it may have mechanical or hydraulic components. It may also have an electric motor.

An electronic controller 88 is also provided. This electronic controller 88 has a memory storage device 90 in which a control program is stored. It may be provided that actuation mechanism 86 or the actuation of clutch device 46 is controlled via this electronic controller 88. It may also be provided—in addition to or alternatively—that the transmission device 48 is controllable by electronic controller 88. This may be the case in particular if transmission device 48 is configured as an automated-shift transmission. However, transmission device 48 may also be configured differently.

A separate electronic controller for driving transmission device 48, which is not depicted in FIG. 2, may also be provided. An actuation mechanism 92 is also provided via which transmission device 48 may be operated.

Such an actuation mechanism 92 may have, for example, electric motors, in particular an electric motor for adjusting the transmission device in the select direction and an electric motor for adjusting the transmission device in the shift direction.

Actuation mechanism 92 may be based on very different principles, such as a mechanical and/or hydraulic principle. In the design according to FIG. 2, transmission device 48 also has gear steps 94, 96, 98, 100, 102, between which it is possible to shift via actuation device 92 and via shift elements 104, 106, 108, which may also be a part of actuation device 92, as is schematically indicated by double arrows 110, 112, 114.

In the design according to FIG. 2, gear steps 94, 96, 98, 100 are forward gears, while gear step 102 is a gear step of the reverse gear. For example, this is evident in FIG. 2 in that a gear wheel 120 is provided between gear wheels 116 and 118 that effects a reversal of rotary direction relative to gear wheels 122, 124 or 126, 128 or 130, 132 or 134, 136.

However, it should be noted that the invention is not limited to a geared transmission or stepped manual transmission.

When internal combustion engine 40 is operated, engine output shaft 78 is loaded in a pre-determined rotary direction, as is diagrammatically indicated by arrow 138. In the embodiment depicted in FIG. 2, this is always the same rotary direction. However, it may also be provided that when there is a driving load by internal combustion engine 44, different rotary directions of engine output shaft 78 may be effected.

Likewise, it is possible that the rotary direction of engine output shaft 78 is opposite rotary direction 138 depicted in FIG. 2.

If drive train 40 is driven by internal combustion engine 44 and clutch device 46 is engaged or is engaged in such a manner that it does not slip, this causes transmission input shaft 84 to be loaded in the rotary direction that corresponds to rotary direction 138. This is schematically indicated by arrow 140.

If a forward gear step 94, 96, 98 or 100 is shifted into the power flow, shaft 142, on which gear wheels 124, 128, 132, 136 and 118 are mounted, rotates in the direction opposite the rotary direction of engine output shaft 78, as indicated by arrow 144.

If reverse gear step 102 is shifted into the power flow, shaft 142 rotates in the direction indicated by arrow 146, which corresponds to rotary direction 138 of engine output shaft 78. This is attributable to the fact that interposed gear wheel 120 in the design shown in FIG. 2 effects a reversal of rotary direction relative to the forward gears.

In drive train 40, a play is present between pre-determined drive train components.

The particular play and/or the play at pre-determined points of drive train 40 may be closed or kept closed under pre-determined conditions via the device shown in FIG. 2.

This is possible in particular if drive train 40 is driven by its output side. Such a situation may occur, for example, if the motor vehicle is on a slope with the service brake actuated 62, 64, 66, 68, 70, 72, 74 and clutch device 46 is engaged, and, as a result of the downgrade force, motor vehicle 42 is set in motion—especially from a standstill—despite the actuation of service brake 62, 64, 66, 68, 70, 72, 74.

In the design shown in FIG. 2, this closing of the play is effected via the control program stored in memory storage device 90.

The closing of the play will now be explained in detail via an example referring to FIGS. 3 to 5. In this example, play is present at the meshing point between gear wheels 134, 136.

Figure 3:
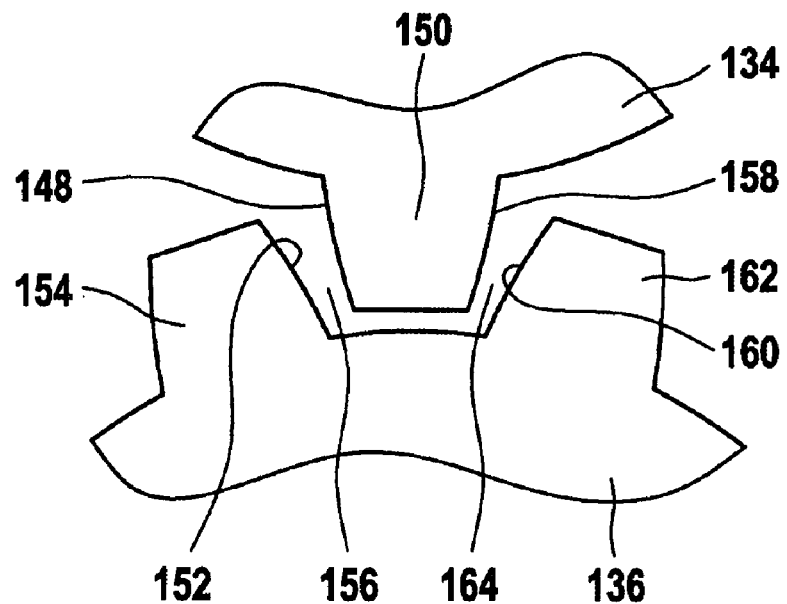
FIG. 3 shows a gear pair of a forward gear step in which there is play between the gear wheels, in diagrammatic exemplary design.
Figure 4:
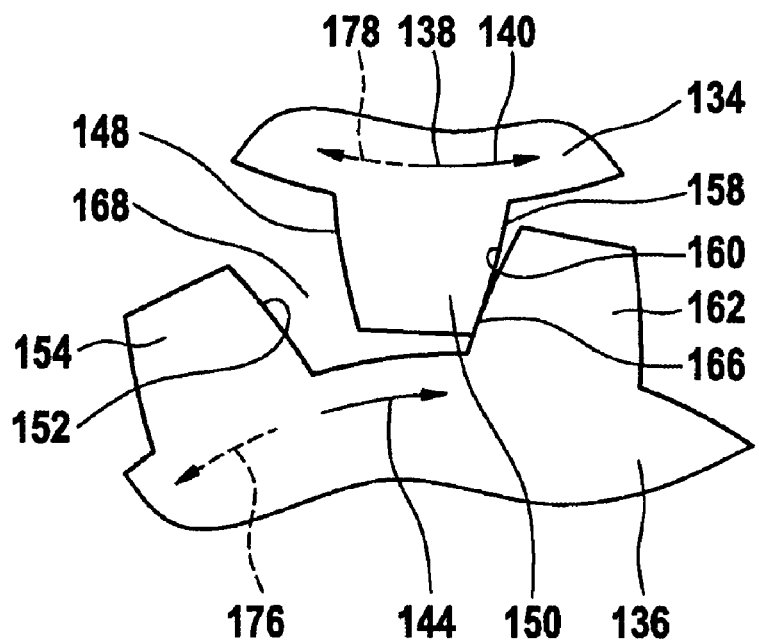
FIG. 4 shows a gear pair according to FIG. 3 in a different relative position.
Figure 5:
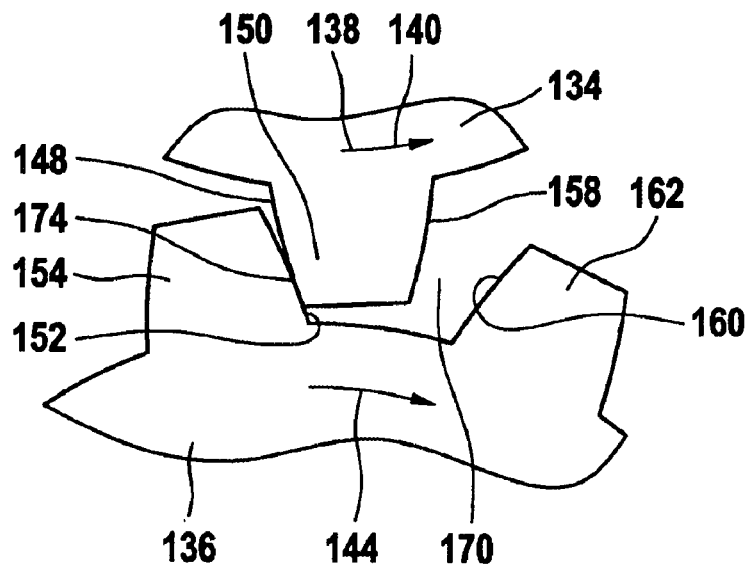
FIG. 5 shows a gear pair according to FIG. 3 and FIG. 4 in another relative position; and, FIG. 6 shows a gear set of a reverse gear in which there is play between the gear wheels, in diagrammatic exemplary form.

FIGS. 3 to 5 show these meshing points from the perspective of line A-A in FIG. 2 in diagrammatic illustration.

In the following explanation, it is assumed that the transmission step shown in FIGS. 3 to 5 is shifted into the power flow of drive train 40.

In the following explanation, an assumption is made that transmission step 100, which is shown in FIGS. 3 to 5, is shifted into the power flow of drive train 40, or gear wheels 134 and 136 are essentially rotationally fixedly coupled to the shafts on which they are mounted. Furthermore, an assumption is made that there is essentially a shift out of the torque flow or power flow via remaining transmission steps 94, 96, 98, 102.

FIGS. 3 to 5 each show a section of gear wheels 134 and 136 in the area of the meshing point.

In the illustration shown in FIG. 3, tooth face 148 of tooth 150 is spaced apart from tooth face 152 of tooth 154 of gear wheel 136 so that there is an intermediate space 156. Furthermore, tooth face 158 of tooth 150 of gear wheel 134 is spaced apart from tooth face 160 of tooth 162 of gear wheel 136 so that also in this orientation of the circumferential direction there is an intermediate space 164 between gear wheels 134, 136 or tooth faces 158, 160.

In the area of intermediate space 156 and intermediate space 168, there is a (partial) play between gear wheels 134 and 136. The (partial) play in the area of intermediate space 156 and the (partial) play in the area of intermediate space 168 are added—in the design shown in FIGS. 3 and 4—to an overall play between gear wheels 134 and 136. Fundamentally, this may also be configured differently for gear wheels. Therefore, a (partial) play in the one direction, for example, could be determined by a first gear wheel and a (partial) play could be determined by a second gear wheel of the same gear pair, these (partial) plays being present in different orientations.

If gear wheels 134 and 136 are turned in relation to each other, the (partial) play is reduced in one circumferential direction while it expands in the opposite direction; the spatial disposition or distribution of the play between gear wheels 134 and 136 is therefore shifted.

In the relative disposition of gear wheels 134 and 136 shown in FIG. 4, there is essentially no (partial) play between gear wheels 134 and 136 in area 166, while in area 168 there is (partial) play between these gear wheels 134, 136 that essentially corresponds in this case to the (overall) play between these gear wheels 134, 136.

In the relative disposition of gear wheels 134 and 136 shown in FIG. 4, tooth face 158 therefore contacts tooth face 160.

In the relative disposition shown in FIG. 5, tooth face 148 contacts tooth face 152, while in area 170 (between tooth face 158 and tooth face 160) there is a (partial) play that essentially corresponds to the (overall) play between gear wheels 134 and 136.

In FIGS. 4 and 5, the rotary direction—which follows gear wheel 134 if the internal combustion engine 44 drives drive train 40 while clutch device 46 is engaged—is indicated by arrow 140.

If, while clutch device 46 is appropriately closed, internal combustion engine 44 loads drive train 40 in such a manner that the end of the drive train on the output side is driven via internal combustion engine 44 (and if the load is transmitted via gear step 100), gear wheel 134 rotates following the loading of internal combustion engine 44 in the direction of arrow 138 or 140 and loads gear wheel 136 in such a manner that it rotates in the direction of arrow 144, that is, opposite direction 138 or 140. In this context, gear wheels 134, 136 are located in the position shown in FIG. 4. In this position, as mentioned, there is essentially no (partial) play in area 166. There is therefore no play between gear wheels 134 and 136 in the loading direction pre-determined by internal combustion engine 44; the play between gear wheels 134 and 136 is therefore closed. In the direction opposite the load direction pre-determined by internal combustion engine 44, there is (partial) play between gear wheels 134 and 136 in the relative disposition according to FIG. 4, as is made clear in area 168.

If in a design according to FIG. 2—and the exemplary drive of clutch device 46 according to the invention is at first suppressed—clutch device 46 is disengaged, it may occur that the drive train section of motor vehicle 42 that is disposed on the output side of clutch device 46 is driven by the output side, and in particular from a standstill. Such a situation may occur, for example, if motor vehicle 42 is on an incline and as a result of downgrade force—in some cases while the brake is applied—is set in motion.

If forward gear step 100 shown in FIGS. 3 to 5 is engaged and motor vehicle 42 or the aforementioned drive train section is moved or driven by the output side in the forward driving direction, gear wheel 136 in turn rotates in the direction indicated by arrow 144. Because at this point—relative to gear wheels 134 and 136—gear wheel 136 is the driving gear wheel and gear wheel 134 is the driven one, these gear wheels 134, 136 assume the relative position shown in FIG. 5; in this context tooth face 152 of gear wheel 136 rests against tooth face 148 of gear wheel 134, so that there is essentially no (partial) play in this area 174, while in area 170 there is (partial) play, or tooth faces 158 and 160 are spaced apart. The play is opened between gear wheels 134 and 136 in the illustration shown in FIG. 5 (in the load direction pre-determined by internal combustion engine 44).

If clutch device 46 is then closed far enough that internal combustion engine 44 loads drive train 40—based on a corresponding desire on the part of the driver or in creeping mode—in such a manner that the drive train or vehicle 42 is driven or accelerated by it, the play between gear wheels 134 and 136 is transferred from "open" to "closed", and specifically relatively sharply or quickly. This may be associated with an impact. For example, in congested traffic on an incline, this may also occur repeatedly at short time intervals.

According to an exemplary design of the invention as per FIG. 2, it is provided that—if linked to pre-determined conditions—the clutch device is slightly engaged in such a manner that the play is decreased or closed before it is engaged far enough that the transmissible torque is enough for "starting out" or "driving" in accordance with a driver's desire or for "creeping". Therefore, a first clutch torque is set in such a manner that in particular is such that it would not suffice to set motor vehicle 42 in motion on level road against the resistances opposing the movement of the motor vehicle. If the play is closed, as is shown in the relative position according to FIG. 4, clutch device 46 is disengaged according to an exemplary design in such a manner that it is unable to transmit any torque. It may also be provided that, after closing the play, clutch device 46 is driven in such a manner that the driver's desire to "drive" or "start out" is followed or motor vehicle 42 creeps.

It may be provided that the first clutch torque is only produced if the rolling direction of motor vehicle 42 corresponds to the rolling direction associated with the gear step engaged in transmission device 48. For example, if, when forward gear step 100 is engaged, motor vehicle 42 were to be driven by the output side while clutch device 46 is disengaged, gear wheel 136 would rotate corresponding to the direction indicated by dashed arrow 176, that is, against the direction of rotation that is indicated by arrow 144 in FIG. 4; because this gear wheel in this design would in turn drive gear wheel 134, gear wheel 134 would rotate in the direction indicated by dashed arrow 178; therefore tooth face 158 would in turn come to rest or abut against tooth face 160, so that the play between gear wheels 134 and 136 would be closed. If, when this gear step 100 is engaged, clutch device 46 were to be engaged for "starting out" or "driving" (as per driver's desire) or for "creeping", the play would already be closed, so that switching from "open" to "closed" play would not occur when "starting out" or "driving" or "creeping".

It may also be provided that the first clutch torque is only built up if transmission input shaft 84 turns more slowly than engine output shaft 78 and, where applicable, if additional conditions, such as "actuated braking device 62, 64, 66, 68, 70" and "gear in transmission device 48 engaged" and "internal combustion engine 44 running" are present.

Figure 6:
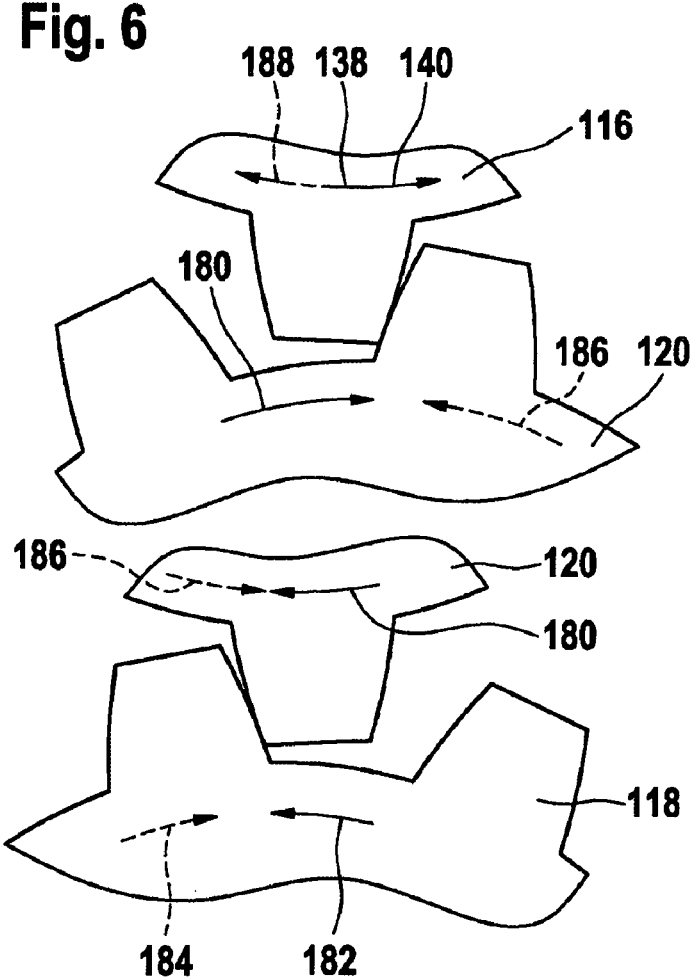

As an example, FIG. 6 shows a closed play for reverse gear step 102. Gear wheels 116, 120 and 118 of reverse gear step 102 from FIG. 2 are shown.

Furthermore, the rotary directions of these gear wheels 116, 120, and 118—which are assigned to reverse gear 102 or are present if drive train 48 is driven by internal combustion engine 44 when clutch device 46 is engaged and reverse gear step 102 is engaged—are indicated by arrows 140, 180 and 182.

The relative position of gear wheels 116, 120 and 118, in which the play between gear wheels 116 and 120 or 120 and 118, respectively, is closed, is present if the section of drive train 40 that is disposed on the output side of clutch device 46 is driven by the output side when clutch device 46 is engaged, as is indicated by dashed arrows 184, 186 and 188, which indicate the rotary directions of gear wheels 116, 120 and 118 for this case.

What is claimed is:

1. A method for controlling a clutch device (46), a braking device (62, 64, 66, 68, 70, 72, 74), and an internal combustion engine (44) in a motor vehicle (42), said clutch device (46) being a starting clutch (46), disposed in a drive train (40) of the motor vehicle (42), said clutch device (46) shiftable into a status in which it cannot transmit any torque and into a status in which it can transmit torque, and said clutch device (46) automatically actuatable, comprising the steps of:
    operating the drive train (40) under pre-determined conditions in a third operating mode or shifted into the third operating mode comprising, when the internal combustion engine (44) is running and the braking device (62, 64, 66, 68, 70, 72, 74) is actuated, engaging the clutch far enough that it is able to transmit a pre-determined, limited, first clutch torque; and,
    operating the drive train (40) in or shifting into the third operating mode if the pre-determined conditions are present and the clutch temperature is less than a pre-determined temperature threshold.

2. The method of claim 1 further comprising: selecting the pre-determined, limited, first clutch torque in such a manner that the torque would not be sufficient on level road to set the motor vehicle (42) in motion from a standstill against resistances opposing a movement of the motor vehicle (42).

3. The method of claim 1 further comprising: keeping a first load and the first clutch torque essentially low enough that it would not be sufficient to overcome resistances opposing the movement of the motor vehicle (42) on level road as long as play is still at least partially open.

4. The method of claim 1 further comprising: keeping a first load or the first clutch torque essentially low enough that it would not be sufficient to overcome resistances opposing the movement of the motor vehicle (42) on level road as long as play is still at least partially open.

5. The method of claim 1 wherein the first clutch torque corresponds to between 0.5% and 3% of the maximum torque producible by the internal combustion engine (44) in the drive train (40) and/or transmissible by the clutch device (46).

6. The method of claim 1 wherein the first clutch torque is within the range of 0.1 Nm to 4 Nm.

7. The method of claim 1 further comprising: building up a first load or the first clutch torque in a ramp-like manner to a pre-determined value.

8. The method of claim 1 further comprising: building up a first load and the first clutch torque in a ramp-like manner to a pre-determined value.

9. The method of claim 1 further comprising: building up the first clutch torque within a pre-determined time period, the time period including within 200 to 800 ms.

10. The method of claim 1 further comprising: driving the clutch device (46) in such a manner that it is open or is opened outside a second or the third operating mode if the motor vehicle (42) is at a standstill, a gear, a forward gear, is engaged in transmission device (46), and a braking device (62, 64, 66, 68, 70, 72, 74) of the motor vehicle (42), a service brake, is actuated.

11. The method of claim 1 further comprising: driving the clutch device (46) in such a manner that it is open or is opened outside a second and the third operating mode if the motor vehicle (42) is at a standstill, a gear, a forward gear, is engaged in transmission device (46), and a braking device (62, 64, 66, 68, 70, 72, 74) of the motor vehicle (42), a service brake, is actuated.

12. The method of claim 1 further comprising: qualitatively or quantitatively determining the inclination of the motor vehicle (42) relative to the ground below.

13. The method of claim 1 further comprising: qualitatively and quantitatively determining the inclination of the motor vehicle (42) relative to the ground below.

14. The method of claim 1 further comprising: providing the braking device (62, 64, 66, 68, 70, 72, 74), a service brake, for braking the motor vehicle (42); and, generating a brake light signal if the braking device (62, 64, 66, 68, 70, 72, 74) is at least partially actuated.

15. The method of claim 1 further comprising: determining the gradient of the braking pressure or the braking pressure of the braking device (62, 64, 66, 68, 70, 72, and 74) of the motor vehicle (42).

16. The method of claim 1 further comprising: determining the gradient of the braking pressure and the braking pressure of the braking device (62, 64, 66, 68, 70, 72, and 74) of the motor vehicle (42).

17. The method of claim 1 further comprising: building up the first clutch torque that is transmissible by the clutch device (46) if it is determined that pre-determined conditions are present and the gradient of the braking pressure exceeds a pre-determined threshold or the braking pressure falls below the pre-determined threshold.

18. The method of claim 1 further comprising: building up the first clutch torque that is transmissible by the clutch device (46) if it is determined that pre-determined conditions are present and the gradient of the braking pressure exceeds a pre-determined threshold and the braking pressure falls below a pre-determined threshold.

* * * * *